July 15, 1947.   J. E. DE GRAAF   2,423,880
METHOD OF MAKING BALL-BEARINGS
Filed June 13, 1940

INVENTOR
JACOB ENGEL DE GRAAF
ATTORNEY.

Patented July 15, 1947

2,423,880

UNITED STATES PATENT OFFICE 2,423,880

METHOD OF MAKING BALL BEARINGS

Jacob Engel de Graaf, Eindhoven, Netherlands, assignor, by mesne assignments, to Hartford National Bank and Trust Company, Hartford, Conn., as trustee Application June 13, 1940, Serial No. 340,414
In Germany March 9, 1939

3 Claims. (Cl. 117—31)

My invention relates to a method of making ball-bearings, more particularly ball-bearings adapted to be mounted in highly-evacuated containers such as X-ray tubes.

The term "ball-bearings" as used herein and in the claims is to be understood to include roller-bearings.

Considerable difficulties arise when a member is mounted on ball-bearings in the highly-evacuated space of electrical devices, such as X-ray tubes. More particularly if no lubricant is used on the bearings, the balls, cut into the surface of the race of the bearing and soon make the bearing unserviceable. On the other hand using any of the ordinary lubricants on the bearings is objectionable because such lubricants have a high-vapor pressure and deleteriously affect the operation of the device, for instance effect any high-tension insulation which may be present in the evacuated space.

The above difficulties are encountered to an increased degree in X-ray tubes having an anode rotatably mounted on ball-bearings, because in the operation of such tubes there are continuous temperature variations and the anode attains a very high temperature.

In my application Serial No. 321,300, now Patent No. 2,361,897 filed February 28, 1940, of which the present application is a continuation-in-part, I have disclosed that the above difficulties may be overcome by providing on the surfaces of the balls and races of the bearing a thin coating of a soft metal such as lead.

It is one object of my present invention to provide for a method of applying such a thin coating of soft metal to the surfaces of the balls and races of the bearings.

Another object of my present invention is to prevent the occlusion of oxygen or other gases in the bearing or coating material when forming a film of soft metal on the surfaces of the balls and races.

In the preparation of a surface film in accordance with my present invention, I introduce a small quantity of a soft metal in a powdered form into the bearings, and then run the bearings for considerable time. The powdered metal must be considerably softer than the material of the balls, which are usually of steel, and I have found that lead is best suited for this purpose. Other metals, such as tin, cadmium, zinc and copper may be used, but are less suitable than lead.

By the introduction of the powdered metal into the bearing a thin coating is applied to the balls and races of the bearings. Thus when the bearings are provided with a small quantity of lead powder, the balls, as well as the surfaces of the races are coated with a lubricating film of lead.

I prefer to apply the coating before mounting the bearing in the evacuated space of the device, and for this purpose I introduce the powder into the bearings and then run the bearing for considerable time, preferably in a space which is evacuated or filled with a gas which will not be occluded by the bearing or coating material.

In order that the invention may be clearly understood and readily carried into effect. I shall describe the same in more detail with reference to the accompanying drawing in which.

Figure 1:
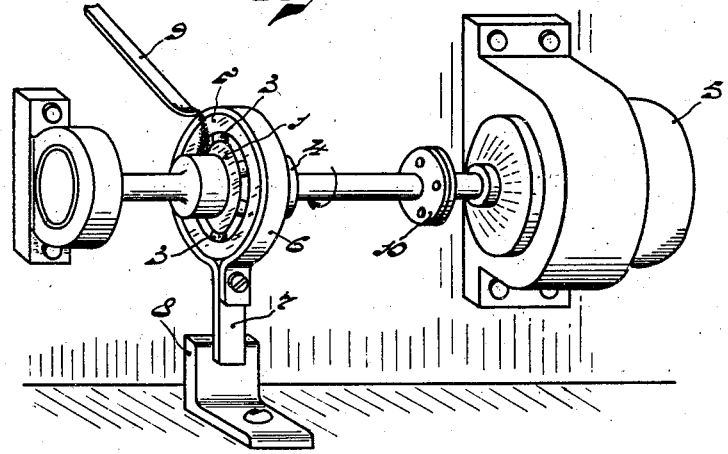
Figure 1 is a perspective view of a device for applying the coating.

In Fig. 1 a bearing is shown having an inner ring 1, an outer ring 2 and balls 3. The inner ring 1 is rigidly secured to a shaft 4 rotatably mounted on a suitable support and connected through a flexible coupling 10 to an electric motor 5. The outer ring 2 is prevented from rotating by a clamp 6 whose end 7 engages a stop 8 secured to the support.

While the ring 1 is being rotated by motor 5 a small quantity of metal powder, for instance lead powder, is introduced into the space between the balls 3 of the bearing by a small spoon 9. The friction of the bearing then increases as can be noticed by a slight increase in the pressure with which the portion 7 engages the stop 8. Upon further rotation of shaft 4 the lead powder is gradually rubbed into the surfaces of the balls and races whereupon the friction of the bearing decreases to about its normal value.

After shaft 4 has rotated for several hours during which small quantities of the lead powder are introduced at intervals into the bearing, the desired coating is formed on the surfaces of the balls and races. As a rule a suitable coating will be obtained when the shaft has been rotated for about ten hours. When bearings coated in the above manner are placed in an X-ray tube to serve as a support for the rotating anode thereof, the anode will run lightly with very little friction and substantially in synchronism with a rotating magnetic field by which it is driven.

Figure 2:
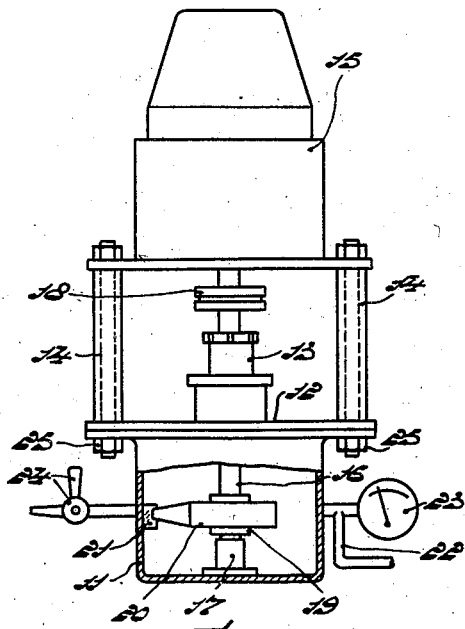
Figure 2 is a partly sectionized view of a similar device serving to rotate the bearing in vacuum or in a special atmosphere.

I prefer to prevent the occlusion of oxygen or other gases in the bearing or coating material. For this purpose the running-in described above may take place in an atmosphere of a suitable gas such as argon, or in vacuum. In such cases an apparatus as shown in Fig. 2 may be used. It comprises a metal casing 11 closed by a cover 12 having a gland 13. Supported from the cover 12 by means of studs 14 there is an electric motor 15. An axis 16 is mounted to rotate on a step-bearing 17. It projects from gland 13 and is connected through a flexible coupling 18 to the motor 15.

The ball-bearing 19 to be prepared is mounted on the axis 16. A clamp 20 as that shown by 6 in Fig. 1 serves to prevent the rotation of the outer ring of the bearing and engages a stop 21 secured to the wall of the vessel.

A tube 22 is connected with the vessel for evacuation purposes and for the introduction of a suitable inert gas, such as argon into the space enclosed by vessel 11. A manometer 23 indicates the pressure within the vessel. A cock may serve for regulating the pressure or for removing the air when gas is let in through tube 22.

After a quantity of powdered metal is introduced into the space between the balls of bearing 19 in the manner shown in Fig. 1, the vessel 11 is secured to the cover 12 by means of nuts 25, whereby axis 16 is put on bearing 17. The vessel is then evacuated through tube 22 or filled with a non-oxidizing gas, such as argon or hydrogen, whereafter motor 15 is started to rotate the axis 16 with the inner ring of ball bearing 19, the outer ring thereof being kept stationary by clamp 20. By this rotation the metal powder is caused to form a thin coating on the surfaces of the balls and races without oxygen being occluded therein. After having rotated some time the bearing may be removed from the vessel and a quantity of the powdered metal may again be introduced in the bearing, whereafter rotation in vacuum or an inert atmosphere is continued.

The precaution described in connection with Fig. 2 is not absolutely necessary when the bearings during their use are protected against high temperatures. However, in constructions in which the liberation of gas from the bearings has to be taken into consideration, I prefer to avoid the occlusion of gas as much as possible.

Although I have described my invention with reference to specific examples and applications I do not desire to be limited thereto because obvious modifications will appear to one skilled in this art.

What I claim is:

1. A method of forming a thin lubricating coating upon the active surfaces of a bearing having rolling members and a raceway and to be used in an evacuated space, comprising the steps of introducing into the bearing and between the rolling members and the raceway small quantities of a metallic powder which is softer than the metal of the bearing, and rotating the bearing before the same is placed in its operative position within the evacuated space to form the powder into the lubricating coating by the rolling action of the rolling members.

2. A method of forming a thin lubricating coating on the active surfaces of a bearing having rolling members and a raceway and to be used in an evacuated space, comprising the steps of introducing small quantities of lead powder into the bearing and between the rolling members and the raceway, and rotating the bearing before the same is placed in its operative position in the evacuated space to form the lead powder into the lubricating coating by the rolling action of the rolling members.

3. A method of forming a lubricating coating on the active surfaces of a bearing having rolling members and a raceway and to be used in an evacuated space, comprising the steps of introducing into the bearing and between the rolling members and the raceway small quantities of metallic powder which is softer than the metal of the bearing, placing the bearing in a space which is free from oxidizing gas, and rotating the bearing while in said latter space and before placing the bearing in its operative position in said evacuated space to form the powder into the lubricating coating by the rolling action of the rolling members.

JACOB ENGEL DE GRAAF.

REFERENCES CITED

The following references are of record in the file of this patent:

UNITED STATES PATENTS

| Number | Name | Date |
| --- | --- | --- |
| 1,658,173 | Perks | Feb. 7, 1928 |
| 197,572 | Spring | Nov. 27, 1877 |
| 330,389 | Pfanstiehl | Nov. 17, 1885 |
| 2,004,708 | Emory | June 11, 1935 |
| 1,176,603 | Riddell | Mar. 21, 1916 |
| 2,158,461 | Koehring | May 16, 1939 |
| 2,293,037 | Atlee | Aug. 18, 1942 |
| 2,075,518 | Gettleman | Mar. 30, 1937 |
| 2,315,280 | Skehan | Mar. 30, 1943 |
| 2,142,723 | Walker et al. | Jan. 10, 1939 |
| 2,304,371 | Queneau et al. | Dec. 8, 1942 |

FOREIGN PATENTS

| Number | Country | Date |
| --- | --- | --- |
| 578,433 | Germany | June 23, 1933 |